United States Patent
Wilkinson et al.

(10) Patent No.: US 9,356,703 B2
(45) Date of Patent: May 31, 2016

(54) HIGH-SPEED LOW-JITTER COMMUNICATION SYSTEM

(71) Applicant: Raytheon Company, Waltham, MA (US)

(72) Inventors: Steven R. Wilkinson, Stevenson Ranch, CA (US); Gabriel N. Price, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 135 days.

(21) Appl. No.: 14/336,129

(22) Filed: Jul. 21, 2014

(65) Prior Publication Data

US 2015/0016827 A1    Jan. 15, 2015

Related U.S. Application Data (63) Continuation of application No. 13/469,650, filed on May 11, 2012, now Pat. No. 8,787,767.

(60) Provisional application No. 61/594,655, filed on Feb. 3, 2012.

(51) Int. Cl.
*H04B 10/00* (2013.01)
*H04B 10/516* (2013.01)
(Continued)

(52) U.S. Cl.
CPC ............ *H04B 10/516* (2013.01); *H04B 10/548* (2013.01); *H04B 10/61* (2013.01); *H04B 10/611* (2013.01); *H04L 27/2096* (2013.01);
(Continued)

(58) Field of Classification Search
USPC .................................................. 398/182–201
See application file for complete search history.

(56) References Cited

U.S. PATENT DOCUMENTS

| 4,406,003 A | 9/1983 | Eberly et al. |
| H000933 H * | 7/1991 | Buczek ................... G01S 17/36 250/338.1 |

(Continued)

FOREIGN PATENT DOCUMENTS

| EP | 1962443 A1 | 8/2008 |
| JP | 1079544 A | 3/1998 |

(Continued)

OTHER PUBLICATIONS

"European Application Serial No. 13743582.2, Extended European Search Report mailed Feb. 26, 2015", 10 pgs.

(Continued)

*Primary Examiner* — Agustin Bello
(74) *Attorney, Agent, or Firm* — Schwegman Lundberg & Woessner, P.A.

(57) ABSTRACT

Communication apparatus and techniques, such as for optical communication, can include providing a reference frequency derived from an atomic energy level transition or a molecular energy level transition, generating at least two specified optical carrier signals at least in part using the reference frequency, coherently modulating the specified optical carrier signals using respective baseband information signals to provide respective coherently-modulated optical subcarriers. A combined optical information signal comprising the optical subcarriers can be transmitted to a receiver, such as via a fiber optic cable. In an example, a received optical information signal can be optically Fourier transformed to provide respective coherent outputs, which can be coherently downconverted.

23 Claims, 5 Drawing Sheets

(51) Int. Cl.

| | |
|---|---|
| *H04B 10/548* | (2013.01) |
| *H04B 10/61* | (2013.01) |
| *H04L 27/20* | (2006.01) |
| *H04L 27/26* | (2006.01) |
| *H04L 27/38* | (2006.01) |
| *H04J 14/02* | (2006.01) |

(52) U.S. Cl.
CPC ........ *H04L27/2697* (2013.01); *H04L 27/3818* (2013.01); *H04J 14/0298* (2013.01)

(56) References Cited

U.S. PATENT DOCUMENTS

| | | | |
|---|---|---|---|
| 5,347,525 A | 9/1994 | Faris | |
| 5,956,318 A | 9/1999 | Saeki | |
| 6,064,663 A | 5/2000 | Honkasalo et al. | |
| 6,178,036 B1 | 1/2001 | Yao | |
| 6,388,787 B1 | 5/2002 | Bischoff | |
| 6,441,933 B1 | 8/2002 | Jang | |
| 6,535,328 B2 | 3/2003 | Yao | |
| 6,608,848 B2 | 8/2003 | Kleinschmidt et al. | |
| 6,717,967 B2 | 4/2004 | Cliche et al. | |
| 6,785,303 B1 | 8/2004 | Holzwarth et al. | |
| 6,850,543 B2 | 2/2005 | Cundiff et al. | |
| 6,850,710 B1 | 2/2005 | Mells | |
| 7,012,912 B2 | 3/2006 | Naguib et al. | |
| 7,085,499 B2* | 8/2006 | Yap | G02B 6/2861 398/161 |
| 7,123,402 B1* | 10/2006 | Doerr | H04J 14/02 359/326 |
| 7,277,636 B1 | 10/2007 | Gazdzinski | |
| 7,317,574 B2 | 1/2008 | Zoller et al. | |
| 7,376,354 B2 | 5/2008 | White | |
| 7,391,367 B2 | 6/2008 | Newberg et al. | |
| 7,418,205 B2* | 8/2008 | Litvin | H04J 14/005 359/278 |
| 7,469,106 B2 | 12/2008 | Feced et al. | |
| 7,508,851 B2 | 3/2009 | Yoshitomi et al. | |
| 7,532,400 B2 | 5/2009 | Zoller et al. | |
| 7,561,807 B2* | 7/2009 | Doerr | H04B 10/60 359/326 |
| 7,580,630 B2 | 8/2009 | Kee et al. | |
| 7,583,711 B2* | 9/2009 | Tiemann | H01S 3/1398 372/29.01 |
| 7,593,643 B2 | 9/2009 | Diels | |
| 7,593,644 B2 | 9/2009 | Kaertner et al. | |
| 7,603,037 B2* | 10/2009 | Sayyah | H04B 10/25752 398/183 |
| 7,620,318 B2* | 11/2009 | Li | H04B 10/40 398/155 |
| 7,650,080 B2* | 1/2010 | Yap | G02F 2/02 398/161 |
| 7,809,222 B2 | 10/2010 | Hartl et al. | |
| 7,920,272 B2* | 4/2011 | Sebastian | G01C 3/08 356/4.09 |
| 7,940,390 B2 | 5/2011 | Kaertner et al. | |
| 7,982,944 B2 | 7/2011 | Kippenberg et al. | |
| 8,023,540 B2* | 9/2011 | Kupershmidt | H01S 5/14 359/326 |
| 8,159,736 B2 | 4/2012 | Maleki et al. | |
| 8,265,488 B2* | 9/2012 | Davies | H04B 10/2575 398/128 |
| 8,437,638 B2 | 5/2013 | Kobayashi | |
| 8,467,687 B2 | 6/2013 | Sasaki | |
| 8,558,993 B2* | 10/2013 | Newbury | G01S 7/484 356/4.1 |
| 8,565,609 B2* | 10/2013 | Wilkinson | G04F 5/14 398/154 |
| 8,761,603 B1* | 6/2014 | Maleki | G01S 7/003 398/129 |
| 8,787,767 B2* | 7/2014 | Wilkinson | H04B 10/548 398/140 |
| 8,836,405 B2* | 9/2014 | Wilkinson | G04G 7/00 327/147 |
| 8,848,760 B2* | 9/2014 | Vahala | G02B 6/12007 372/92 |
| 8,964,801 B2* | 2/2015 | Reid | H01S 3/06754 372/20 |
| 8,981,273 B2* | 3/2015 | Kuo | G01J 3/02 250/201.1 |
| 2003/0091097 A1* | 5/2003 | Yap | G02F 2/002 375/132 |
| 2004/0037560 A1 | 2/2004 | Mells | |
| 2005/0018724 A1* | 1/2005 | Da Silva | H04B 10/572 372/32 |
| 2005/0271387 A1 | 12/2005 | Kee et al. | |
| 2008/0145063 A1 | 6/2008 | Li et al. | |
| 2009/0257344 A1 | 10/2009 | Huang et al. | |
| 2010/0329683 A1 | 12/2010 | Liu | |
| 2011/0115534 A1* | 5/2011 | Stein | G04F 5/00 327/156 |
| 2011/0134943 A1 | 6/2011 | Hartl et al. | |
| 2011/0170690 A1 | 7/2011 | Shpantzer | |
| 2013/0144561 A1* | 6/2013 | Harb | G01J 3/42 702/189 |
| 2013/0202303 A1 | 8/2013 | Wilkinson et al. | |
| 2015/0016827 A1* | 1/2015 | Wilkinson | H04B 10/548 398/183 |

FOREIGN PATENT DOCUMENTS

| | | |
|---|---|---|
| JP | 2007027214 A | 2/2007 |
| JP | 2009017320 A | 1/2009 |
| WO | WO-2013116644 A1 | 8/2013 |

OTHER PUBLICATIONS

Delfyett, Peter J., et al., "Optical Frequency Combs From Semiconductor Lasers and Applications in Ultrawideband Signal Processing and Communications", *Journal of Lightwave Technology*, 24(7), (2006), 2701-2719.

Huang, Yue-Kai, et al., "Transmission of Spectral Efficient Super-Channels Using All-Optical OFDM and Digital Coherent Receiver Technology", *Journal of Lightwave Technology*, 29(24), (2011), 3838-3844.

Kang, I., et al., "Energy-efficient 026-Tb/s coherent-optical OFDM transmission using photonic-integrated all-optical discrete Fourier transform", *Optics Express*, 20(2), (2012), 896-904.

Lee, Kysusang, "All optical discrete Fourier transform processor for 100 Gbps OFDM transmission", 0 *Optics Express*, 16(6), (2008), 4023-4028.

Sano, Akihide, et al., "No-Guard-Interval Coherent Optical OFDM fo r 100-Gb/s Long-Haul WDM Transmission", *Journal of Lightwave Technology*, 27(16), (2009), 3705-3713.

"U.S. Appl. No. 13/469,650, Notice of Allowance mailed Mar. 10, 2014", 10 pgs.

"International Application Serial No. PCT/US2013/024338, International Search Report mailed Jun. 14, 2013", 4 pgs.

"International Application Serial. No. PCT/US2013/024338, Invitation to Pay Additional Fees and Partial Search Report mailed Mar. 15, 2013", 3 pgs.

"International Application Serial No. PCT/US2013/024338, Written Opinion mailed Jun. 14, 2013", 6 pgs.

Armstrong, J., "OFDM for Optical Communications", Journal of Lightware Technology, 27(3), (2009), 189-204.

Hillerkuss, D., "Simple all-optical FFT scheme enabling Tbit/s real-time signal processing", Optics Express, 18(9), (Apr. 26, 2010), 9324-9340.

Hillerkuss, D., "Single Source Optical OFDM Transmitter and Optical FFT Receiver Demonstrated at Line Rates of 5.4 and 10.8 Tbit/s", 2010 Conference on (OFC/NFOEC) Optical Fiber Communication (OFC), collocated National Fiber Optic Engineers Conference, (2010), 1-3.

Ko, Ming-Sheng, "Rubidium 5S1/2—7S1/2 two-photon transition", National Tsing Hua University, Master's dissertation, (Jul. 28, 2004), 54 pgs.

Shieh, W., et al., "Coherent optical orthogonal frequency division multiplexing", Electronics Letters, 42(10), (2006), 2 pgs.

"U.S. Appl. No. 13/469,650, Comments on Statmetn of Reasons for Allowance filed Jun. 10, 2014", 1 pg.

(56) References Cited

OTHER PUBLICATIONS

"U.S. Appl. No. 13/469,650, Examiners Amendment mailed Apr. 23, 2014", 2 pgs.

"International Application Serial No. PCT/US2013/024338, International Preliminary Report on Patentability mailed Aug. 14, 2014", 8 pgs.

"International Application Serial No. PCT/US2013/024338, Response filed Apr. 11, 2013 to Invitation to Pay Additional Fees mailed Mar. 15, 2013", 1 pg.

"Israeli Application Serial No. 233619, Memorandum filed Nov. 4, 2014 in response to Office Action mailed Oct. 21, 2014", 1 pg.

"Israeli Application Serial No. 233619, Office Action mailed Oct. 21, 2014", (w/ English Summary), 6 pgs.

"Israeli Application Serial No. 236497, Office Action mailed Jan. 11, 2015", 3 pgs.

"Japanese Application Serial No. 2014-555750 Response filed Feb. 9, 2015 to Office Action mailed Jan. 6, 2015", (w/ English Translation of Amended Claims), 22 pgs.

"Japanese Application Serial No. 2014-555750, Office Action mailed Jan. 6, 2015", (w/ English Translation), 6 pgs.

\* cited by examiner

HIGH-SPEED LOW-JITTER COMMUNICATION SYSTEM

CLAIM OF PRIORITY

This patent application is a continuation of, and claims the benefit of priority to, under 35 U.S.C. Section 35 U.S.C. 120 to Wilkinson et al., U.S. patent application Ser. No. 13/469,650, filed on May 11, 2012, which claims the benefit of priority under 35 U.S.C. Section 119(e), to Wilkinson et al., U.S. Provisional Patent Application Ser. No. 61/594,655, titled "High-Speed Low-Jitter Communication System," filed on Feb. 3, 2012, the benefit of priority of each of which is claimed hereby, and each of which are incorporated by reference herein in its entirety.

BACKGROUND

Orthogonal frequency division multiplexing (OFDM) is an example of a broader class of multi-carrier data transmission techniques. OFDM can be used as a physical-layer interface in wireless communications, such as to combat multipath fading or frequency-selective fading. For example, OFDM has been incorporated into numerous wireless communication standards such as including IEEE 802.11a/g ("WiFi"), HiperLAN2, and IEEE 806.16 ("WiMAX"), as well as in the digital audio and video broadcasting standards, DAB and DAB-T, used in Asia, Australia, and Europe.

Overview

Figure 1:
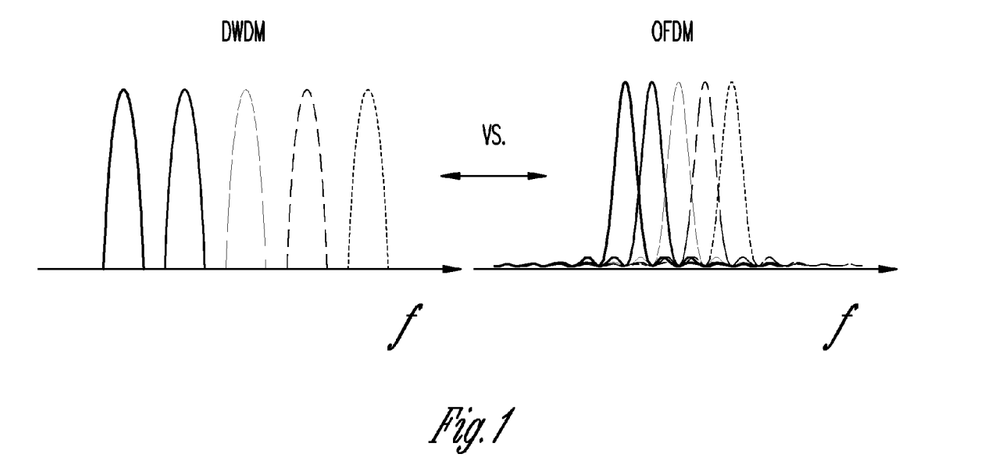
FIG. 1 illustrates generally a comparison between wavelength division multiplexing (WDM) and orthogonal frequency division multiplexing (OFDM).

A high-speed data stream can be transmitted, such as optically, using two or more subcarrier channels, such as using an OFDM technique. The subcarrier channels can operate at a lower transmission rate and in combination can provide the high-speed data stream. Each subcarrier can be at a different frequency and together the subcarriers can form a regularly spaced frequency comb, such as similarly achieved using dense wavelength division multiplexing (DWDM). However, in OFDM there is a mathematical orthogonality between subcarriers, unlike DWDM. Such an orthogonality property allows spectral overlap between subcarriers such as without causing inter-channel interference (ICI), as shown in the example of FIG. 1, such as resulting in improved spectral efficiency, and hence supporting an increased data rate as compared to DWDM.

Generally, generating an OFDM information signal includes modulating both amplitude and phase of the subcarrier signal (e.g., complex modulation), and receiving an OFDM information signal includes coherently demodulating the subcarrier signal. Thus, various synchronization techniques can be used to synchronize an OFDM receiver with an OFDM transmitter to maintain such coherency. In an example, one or more portions of an OFDM transmitter can be locked to a reference frequency provided by a first local optical oscillator included as a portion of the OFDM transmitter apparatus. Similarly, one or more portions of an OFDM receiver can be locked to a reference frequency provided by second local optical oscillator included as a portion of the OFDM receiver apparatus.

In an example, a local optical oscillator can be configured to provide the reference frequency at least in part using one or more of atomic energy level transition or a molecular energy level transition. Use of such a local optical oscillator can decrease an amount of communication overhead consumed in periodically training or synchronizing an OFDM transmitter with an OFDM receiver. For example, a duration over which the transmitter and receiver can remain synchronized can be extended to several seconds between training intervals.

In an example, such as for optical communication, apparatus and techniques can include providing the reference frequency derived from an atomic energy level transition or a molecular energy level transition, generating at least two specified optical carrier signals at least in part using the reference frequency, and coherently modulating the specified optical carrier signals using respective baseband information signals to provide respective coherently-modulated optical subcarriers. A combined optical information signal comprising the optical subcarriers can be transmitted to a receiver, such as via a fiber optic cable. In an example, a received optical information signal can be optically Fourier transformed to provide respective coherent outputs, which can be coherently downconverted.

In an example, such communication as discussed above (e.g., multi-carrier OFDM communication) need not be optical. A communication channel can include a microwave link, a radio-frequency (RF) link, a conductive communication link such as using one or more of a coaxial conductor arrangement, a twisted pair arrangement, a conductive waveguide configuration, or can include communication using one or more other media or techniques. For example, an information signal (e.g., an OFDM information signal), such as including one or more complex-modulated subcarriers, can be provided such as using an electronic arbitrary waveform generator or other electronic source using a reference frequency provided by a first local optical oscillator. Upon receipt, such an information signal can then be coherently demodulated, such as using one or more of a mixer or an analog-to-digital converter, such as referenced to a second local optical oscillator. As in other examples above, the first and second local optical oscillators can provide respective reference frequencies derived from an atomic energy level transition or a molecular energy level transition.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 illustrates generally a comparison between wavelength division multiplexing (WDM) and orthogonal frequency division multiplexing (OFDM). In DWDM a frequency guard-band is inserted between each subcarrier to prevent inter-channel interference (ICI). In contrast, OFDM subcarriers are orthogonal and can overlap significantly without causing ICI. In OFDM data transmission is achieved by parallel modulation two or more subcarriers, and can include a large number of subcarriers. Prior to transmission, the subcarriers are multiplexed, a process mathematically equivalent to performing the inverse discreet Fourier transform (IDFT) of the subcarrier group. The resulting time domain baseband signal can be represented by:

$$s(t) = \sum_{n=-\infty}^{\infty} \sum_{k=1}^{N_{sc}} \Pi(t - nT_s) c_{nk} e^{j2\pi(t - nT_s)f_k} \quad \text{EQN. 1}$$

$$\Pi(t) = \begin{cases} 1, & (0 < t \le T_s) \\ 0, & (t > T_s \mid t \le 0) \end{cases} \quad f_k = \frac{k-1}{T_s} \quad \text{EQN. 2}$$

where $c_{nk}$ and $f_k$ can represent the $n^{th}$ information symbol and frequency of subcarrier k, respectively, $T_s$, can represent the symbol period, and $N_{sc}$ can represent the total number of subcarriers. Calculation of the inner-product between two arbitrary subcarriers, can be represented by, $$\frac{c_{nk} c_{lk}^*}{T_s} \int_0^{T_s} e^{j2\pi(f_k - f_l)t} dt = \frac{c_{nk} c_{lk}^*}{T_s} \frac{\sin(\pi(f_k - f_l)T_s)}{\pi(f_k - f_l)}, \quad \text{EQN. 3}$$

and can demonstrate that if the condition, $$f_k - f_l = m \frac{1}{T_s} \quad \text{EQN. 4}$$

is satisfied for any integer m, then the two subcarrier are orthogonal to each other. This means that if subcarriers are spaced by multiples of the inverse data modulation rate, significant spectral overlap is possible without causing inter-carrier interference. Spectral efficiency can be maximized when the modulation rate is equal to the spacing between subcarrier channels, (e.g., when m=1).

Subcarrier spectral overlap makes the separation of channels at the receiver using conventional frequency filtering (e.g. narrowband filtering of each subcarrier) impractical. Rather, subcarriers can be demultiplexed via a discrete Fourier transform (DFT) of the time domain signal. This can be carried out electronically if the received signal is detected at a sufficiently high bandwidth, or it can be carried out optically prior to detection. Optical DFT techniques can remove the electronic bottleneck of high speed detection and subsequent DFT calculation.

In addition to its improved spectral efficiency over DWDM, two strengths of OFDM over other transmission techniques, such as DWDM or time-division multiplexing (TDM), include OFDM's inherent robustness to chromatic and polarization mode dispersion. For example, polarization mode dispersion can be a particularly large impediment to wide-spread data transmission at rates of 40 gigabits per second (Gb/s) and higher using in-ground fiber optics. Mitigation of these channel impairments can be accomplished via the insertion of a temporal guard interval of duration that can be represented by $\Delta_G$, satisfying the relation, $$\frac{c}{f^2} |D_t| N_{sc} \Delta f + DGD_{max} \le \Delta_G \quad \text{EQN. 5}$$

where c can represent the speed of light, f can represent the center subcarrier frequency, $D_t$ can represent the total accumulated chromatic dispersion in units of ps/pm, $\Delta f$ can represent the frequency spacing between subcarriers, and $DGD_{max}$ can represent a budgeted differential group delay (e.g., a maximum), which, for example, can be about 3.5 times larger than the mean polarization mode dispersion. In an example, satisfaction of the condition of the example above can insure that fiber dispersion does not lead to temporal overlap between symbols.

Figure 2:
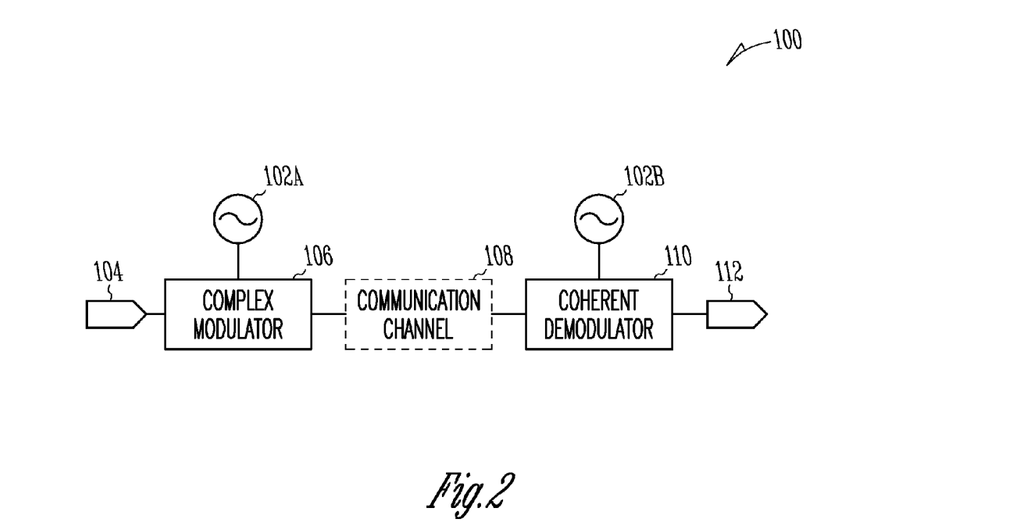
FIG. 2 illustrates generally an example of a communication system that can include first and second local optical oscillators, a complex modulator, and a coherent demodulator.

FIG. 2 illustrates generally an example of a communication system 100 that can include first and second local optical oscillators 102A through 102B, a complex modulator 106, and a coherent demodulator 110. In an example, a baseband information signal can be provided to an input 104 of a complex modulator 106. The complex modulator 106 can be synchronized or otherwise "locked" to a first reference frequency provided by a first local optical oscillator 102A. The complex modulator 106 can be configured to modulate one or more of an amplitude or a phase of one or more carrier signals, such as to provide an OFDM information signal coupled to a coherent demodulator 110 via a communication channel 108.

The communication channel 108 can include one or more of an optical communication link, a wireless electromagnetic communication link, or a conductive communication link. The coherent demodulator 110 can recover the baseband information signal (or a detected approximation of the baseband information signal), such as provided by a baseband information output 112. In order to demodulate the information signal provided by the complex modulator 106, the coherent demodulator 110 can be coupled to a second local optical oscillator 102B, and the coherent demodulator 110 can be synchronized or can otherwise use a second reference frequency provided by the second local optical oscillator 102B. For example, the coherent demodulator can include one or more mixers, and the one or more mixers can be coupled to respective local oscillators derived from the second reference frequency provided by the second local optical oscillator 102B.

In an example, if both the first and second optical oscillators provide respective reference frequencies derived from an atomic energy level transition or a molecular energy level transition, a frequency offset between the first reference frequency and the second reference frequency can be specified to provide a symbol error rate of received information below a specified threshold for a duration of at least one second or more of information transfer without requiring a resynchronization between the transmitter and the receiver. In this manner, as discussed below, a greater overall data transfer rate is possible because less communication overhead is needed in sending synchronization information via the communication channel 108 rather than useful data.

Figure 3:
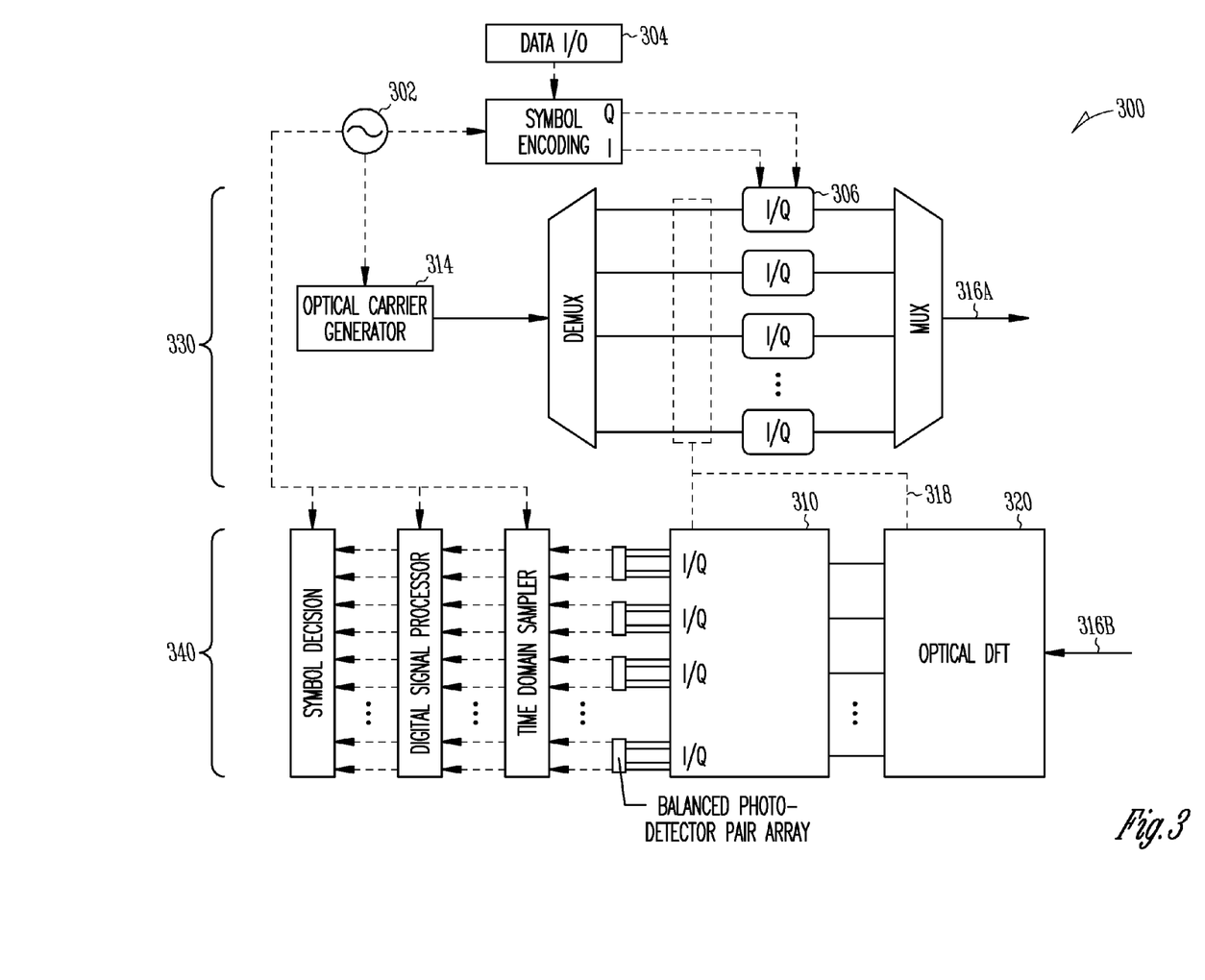
FIG. 3 illustrates generally an architectural view of an illustrative example of communication system.

FIG. 3 illustrates generally an architectural view of an illustrative example of communication system 300 (e.g., a transceiver). In FIG. 3, connections that can be electrical are shown as broken lines, and connections that can be optical are shown with solid lines. Multiple subcarriers can be generated by an optical carrier generator 314 (e.g., optical frequency comb phase-locked to a precision frequency reference 302, such as an RF source such as derived from a local optical oscillator). The frequency spacing between subcarriers can establish an upper limit upon data transmission rate per subcarrier such as to maintain channel orthogonality. Electronic detector speeds can establish an upper limit on channel spacing, and optical waveguide size restrictions and resolution requirements can establish a corresponding lower limit. In an example, the optical carrier generator 314 can include one or more of a mode-locked laser, a phase-modulated CW laser, a recirculating frequency shifter, or one or more other techniques or apparatus can be used, such as to provide an optical frequency comb comprising optical subcarriers. The subcarriers can be demultiplexed prior to data modulation, such as using an arrayed waveguide grating (AWG), or using one or more other techniques. For example, by selecting an AWG with a free spectral range equal to a multiple of the spacing between subcarriers, the number of independent data streams can be chosen.

Following subcarrier demultiplexing, independent data channels can be coherently modulated such as using a complex modulator 306. In an example, a complex modulator driver can be coupled to a baseband information source 304 to provide baseband information signals such as for driving the in-phase and quadrature inputs of a parallel array of I/Q modulators. The array can include a respective complex modulator 306 for each respective subcarrier. The OFDM time domain signal can be formed by combining the subcarriers into a single multiplexed optical information signal using an optical combiner (e.g., an optical multiplexer), such as including a second arrayed waveguide grating, or other apparatus. This combining can be treated as equivalent to taking the inverse discrete Fourier transform of the subcarrier group, such as to provide an optical information signal output 316A for transmission through an optical fiber.

In an example, such as at a far end of such an optical fiber, or otherwise at a receiving end of the communication link at a receiver input 316B, the subcarriers can be coherently detected, such as using an optical mixer 310 (e.g., an optical hybrid) coupled to respective balanced detectors, and then digitally sampled.

A discrete Fourier transform (DFT), such as provided by an optical Fourier transform module 320, can be used to demultiplex and recover the individual subcarriers from the optical information signal. The temporal window over which the receiver-end DFT is carried out is generally synchronized to the symbol arrival rate and symbol duration. A frequency offset between the transmitter LO and the local oscillator used in the receiver's optical hybrids can be measured and compensated, such as via digital signal processing.

In an example, one or more optical carriers can be coupled from a transmitter block 330 of the system 300 to one or more portions of a receiving block 340 of the system 300, such as using an optical coupling 318. In addition, or instead, in an example, one or more portions of the receiving block 340 can be electrically coupled to the local optical oscillator 302, such as to use one or more reference frequencies provided by the local optical oscillator 302 (e.g., the local optical oscillator 302 can transfer the stability of its optical oscillator into the RF frequency range for use by other portions of the system 300).

Figure 5:
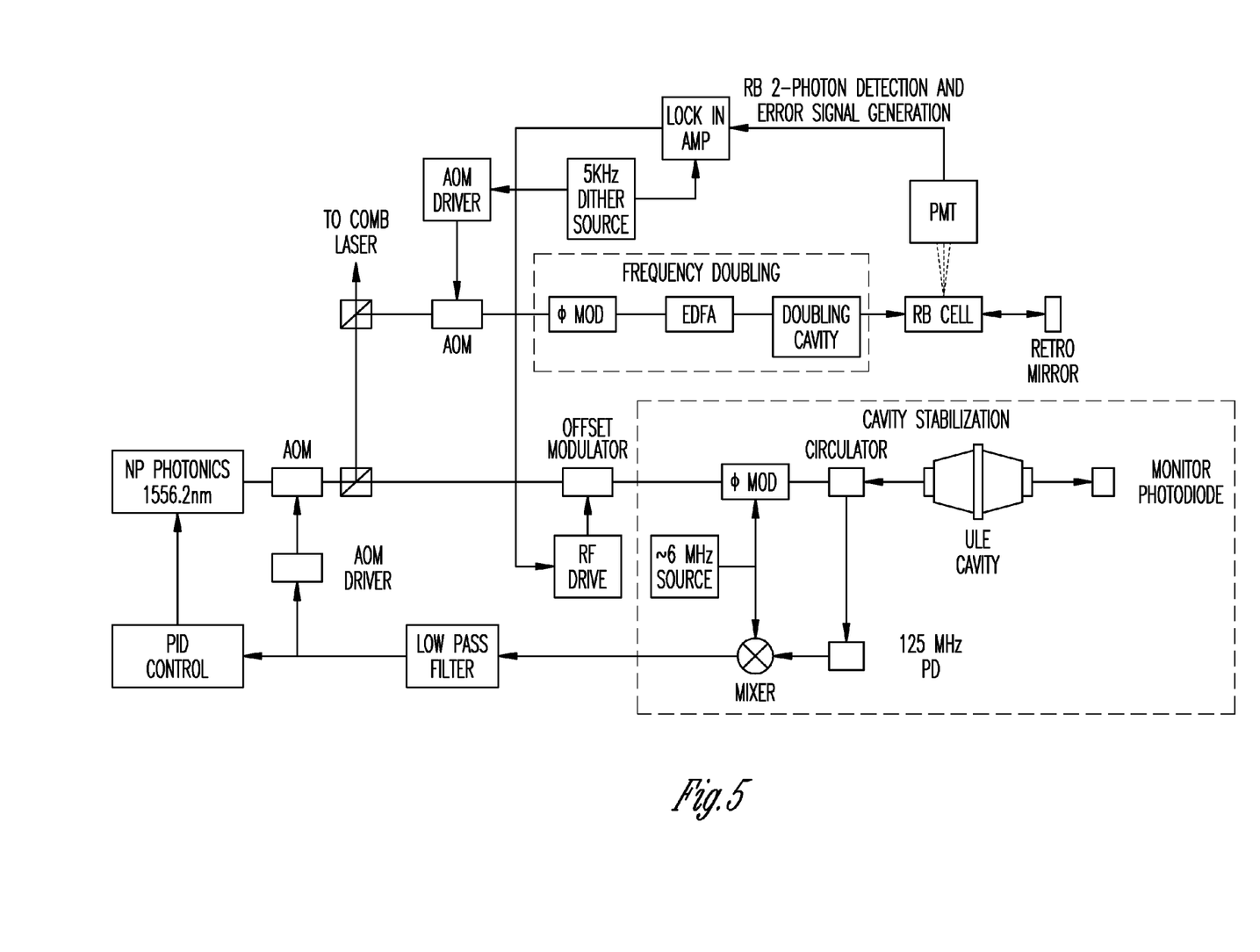
FIG. 5 illustrates generally an example of at least a portion of an optical oscillator that can be referenced to an atomic energy level transition or a molecular energy level transition and FIG. 6 illustrates generally an example of a frequency comb generator, such as referenced to a signal provided by the apparatus of the example of FIG. 5.
Figure 6:
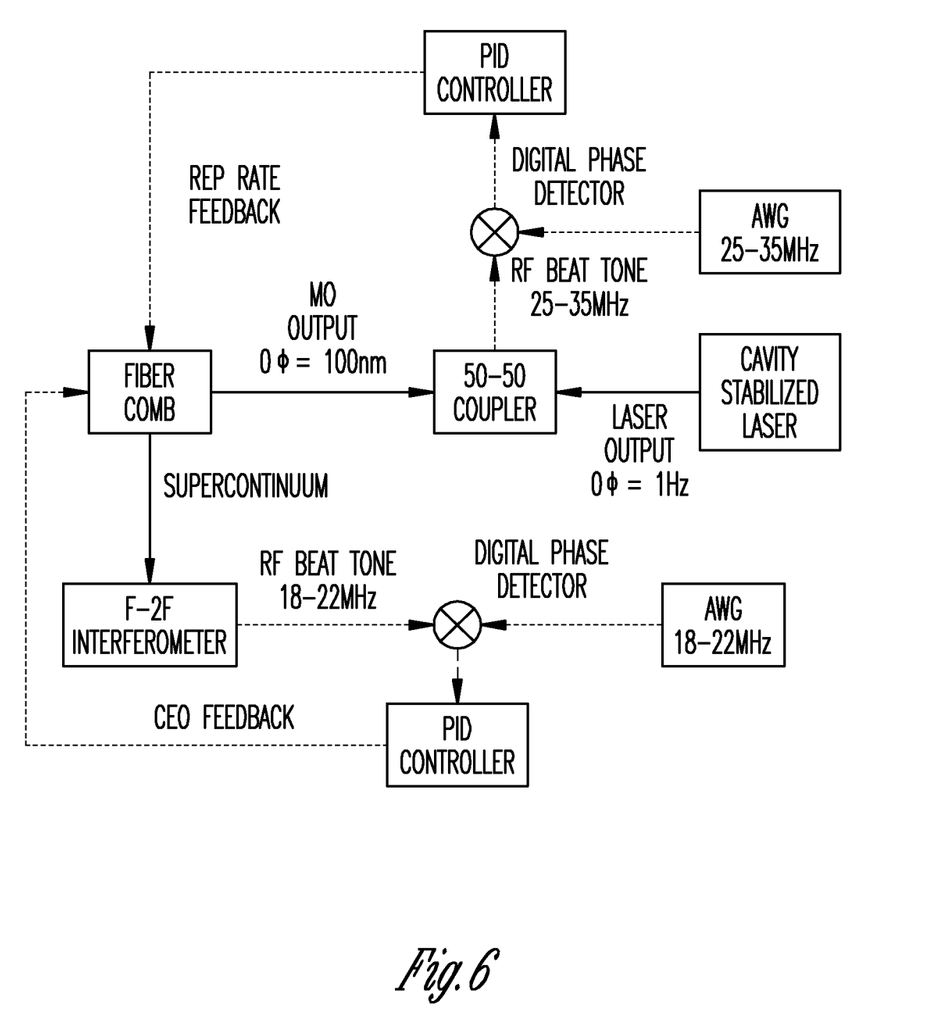

In one approach, initial synchronization can be performed using a Schmidl-Cox technique, such as using pilot-tones and test symbols, but resulting in a reduction of useful transmission bandwidth. The duration over which useful synchronization is maintained can be limited by the stability of the frequency references used in the transmitter and receiver (e.g., provided by a local optical oscillator 302). Such a duration can be limited to a time scale of microseconds in the absence of a high-stability frequency reference, after which time resynchronization is generally performed. Integration of ultra-stable frequency references such as derived from an integrated (e.g., local) optical clock in both the transmitter and receiver, can increase duration of useful synchronization up to several seconds or more. In an example, the local optical oscillator 302, such as shown in the examples of FIGS. 5 through 6, can provide such an ultra-stable reference frequency.

A frequency offset between the transmitted optical carrier and the local optical oscillator 302 used at the receiver for coherent detection can break the orthogonality between subcarriers, such as resulting in detrimental inter-channel interference (ICI). To mitigate the potential offset, in one approach, lasers used in telecommunication can be frequency locked to an International Telecommunication Union (ITU) frequency standard with approximately 2.5-GHz accuracy. This configuration results in a frequency offset between the two optical sources as large as 5 GHz. The down-converted baseband electronic signal can be shifted by at least this frequency offset amount, necessitating higher bandwidth, and more expensive, electronics in the receiver than dictated by the bandwidth of the transmitted data alone. The present inventors have recognized, among other things, that integrated optical clocks in the transmitter and receiver locked to the same atomic or molecular frequency reference can reduce such a frequency offset between transmitter and receiver from about GHz-range to about Hz-range, eliminating a need for unnecessary electronic bandwidth for baseband processing, and decreasing subcarrier separation.

Coherent Optical Detection

Figure 4A:
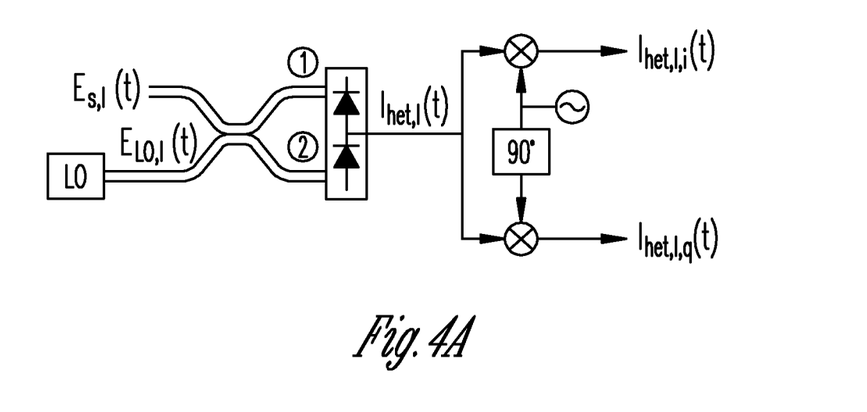
FIGS. 4A and 4B illustrate generally examples of coherent demodulators that can include a heterodyne configuration in FIG. 4A and a homodyne configuration in FIG. 4B.
Figure 4B:
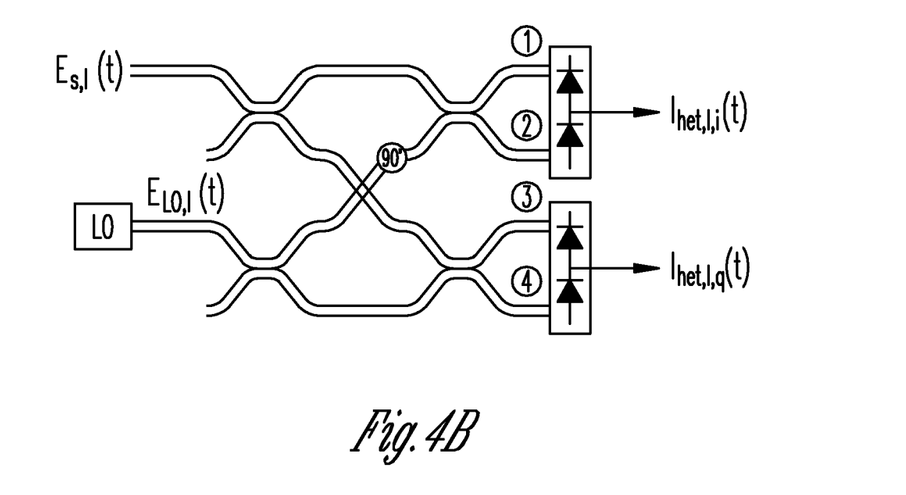

FIGS. 4A and 4B illustrate generally examples of coherent demodulators that can include a heterodyne configuration in FIG. 4A and a homodyne configuration in FIG. 4B. Such coherent demodulators can be included as a portion of the communication systems shown in the examples of FIGS. 2 through 3, such as included as a portion of the optical mixer 310 and corresponding photodetectors.

Digital information transfer generally involves efficient use of the finite available bandwidth. For example, an optical fiber can support data transfer rates at or in excess of terabit per second (Tb/s) rates. The Shannon capacity generally places an upper limit on the number of bits per symbol that can be successfully transmitted in the presence of additive white Gaussian noise (AWGN) for a given signal-to-noise ratio per symbol, and can be represented by $\xi_E$, $$b_{max} = \log_2(1 + \xi_E). \quad \text{EQN. 6}$$

This limit, in turn, can govern the achievable spectral efficiency, which can be represented in bit/s/Hz. In an illustrative example, if $N_{ch}$ channels are available for data transmission, and the power of the transmitter (e.g., a transmitting laser) is divided equally among them, the total bit capacity of the system can be given by, $$b_{tot} = N_{ch} \log_2\left(1 + \frac{\xi_s}{N_{ch}}\right), \quad \text{EQN. 7}$$

which is a monotonically increasing function of $N_{ch}$. Therefore, one transmission strategy can be to distribute a given signal among all available channels, including all degrees of freedom (DOF) of the transmitted optical field, such as including amplitude and phase. Data modulation techniques utilizing optical phase (e.g., quadrature amplitude modulation (QAM)) can be referred to as coherent. In addition to increasing spectral efficiency, modulation of both the amplitude and phase, or equivalently the in-phase (I) and quadrature (Q) components of a signal, can provide great flexibility in terms of available modulation formats.

Coherent modulation formats are generally received using coherent detection of the transmitted signal for symbol recovery. In an illustrative example, down-conversion of a received optical passband signal to an electronic baseband signal can be performed such as through mixing the optical passband signal (e.g., a modulated optical subcarrier signal that can be represented by $E_{s,i}(t)$), with a local oscillator (LO) such as using a square-law photodetector.

In an example, a receiver can be implemented in either a homodyne or a heterodyne configuration, or using one or more other configurations or techniques. In a homodyne configuration, the frequency of the LO is matched to the frequency of the carrier so that the electronic output of the photodetector is at baseband. In a heterodyne configuration, the LO and carrier can differ in frequency, resulting in a down-converted signal at an intermediate frequency (IF) rather than at baseband. In such a heterodyne example, a subsequent down-conversion from IF to baseband can be performed in the electrical domain such as using mixing with an electronic LO.

In an illustrative example of a heterodyne receiver configuration, an output current of a balanced photodetector can be represented by, $$I_{het,l}(t) = R(|E_1|^2 - |E_2|^2) \qquad \text{EQN. 8}$$

where R can represent the responsivity of each matched photodiode, and $E_i$ can represent the electric field produced such as by mixing $E_{s,i}(t)$ $E_{LO,i}(t)$ in the $i^{th}$ photodiode. The values of $E_1$ and $E_2$ can be related to the input signal and LO through the relations, $$E_1 = \frac{1}{\sqrt{2}}[E_{s,l}(t) + jE_{LO,l}(t)] \qquad \text{EQN. 9}$$

$$E_2 = \frac{1}{\sqrt{2}}[jE_{s,l}(t) + E_{LO,l}(t)] \qquad \text{EQN. 10}$$

such as where a 2×2 fiber coupler transfer function is assumed, $$\frac{1}{\sqrt{2}}\begin{bmatrix} 1 & j \\ j & 1 \end{bmatrix} \qquad \text{EQN. 11}$$

and the field of the local oscillator can be represented by, $$E_{LO,1}(t) = \sqrt{P_{LO,1}}\, e^{j[\omega_{LO}t + \phi_{LO}(t)]} \qquad \text{EQN. 12}$$

where $\sqrt{P_{LO,l}}$, $\omega_{LO}$, and $\phi_{LO}$ can respectively represent the average power, the angular frequency, and the phase of the LO. Insertion of the expressions for $E_1$ and $E_2$ into $I_{het,l}(t)$ yields, $$I_{hst,l}(t) = \qquad \text{EQN. 13}$$
$$\frac{R}{2}\{[E_{s,l}(t) + jE_{LO,l}(t)][E_{s,l}^*(t) - jE_{LO,l}^*(t)] - [jE_{s,l}(t) + E_{LO,l}(t)]$$
$$[-jE_{s,l}^*(t) + E_{LO,l}^*(t)]\}.$$

which after algebraic simplification becomes, $$I_{het,l}(t) = 2R\,\mathrm{Im}\{E_{s,l}(t)E_{LO,l}^*(t)\} + I_{sh,l}(t) \qquad \text{EQN. 14}$$

where $I_{sh,l}(t)$ can represent the LO shot noise. The in-phase (I) and quadrature (Q) components of $I_{het,l}(t)$ can be found explicitly, such as by substitution of $E_{s,l}(t)$ and $E^*_{LO,l}(t)$ into the above expression, yielding $$I_{het,l}(t) = 2R\,\mathrm{Im}\{\sqrt{P_r P_{LO,l}}\, y_{Z,l}(t)e^{j\phi(t)} + E_{sp,l}(t)E_{LO,l}(t)\} + I_{sh,l}(t) \qquad \text{EQN. 15}$$

where $$y_{z,l}(t) = \sum_k \sum_{m=1}^{2} x_{m,k} c_{lm}(t - kT_s)e^{j\phi(t)}, \qquad \text{EQN. 16}$$

and $$\phi(t) = \phi_s(t) - \phi_{LO}(t) \qquad \text{EQN. 17}$$

The real and imaginary parts of $e^{j\phi(t)}$ and $y_{Z,l}$ can be represented explicitly, $$e^{j\phi(t)} = \cos(\phi) - j\sin(\phi) \qquad \text{EQN. 18}$$

$$y_{Z,l} = y_{I,l} + jy_{Q,l} \qquad \text{EQN. 19}$$

and the imaginary part of the resulting expression can be represented by, $$I_{het,l}(t) = 2R\sqrt{P_r P_{LO,l}}[y_{I,l}\sin(\omega_{IF}t) + y_{Q,l}\cos(\omega_{IF}t)] + 2R\sqrt{P_{LO,l}}\tilde{E}_{sp,l}(t) + I_{sh,l}(t) \qquad \text{EQN. 20}$$

where $$\omega_{IF} \equiv \omega_s - \omega_{LO} \qquad \text{EQN. 21}$$

can represent the intermediate frequency and $$\tilde{E}_{sp,1}(t) \equiv \mathrm{Im}\{E_{sp,1}(t)e^{j[\omega_{LO}t + \phi_{LO}(t)]}\} \qquad \text{EQN. 22}$$

In this heterodyne receiver configuration example, subsequent mixing at $\omega_{IF}$ will separate the in-phase and quadrature component of the transmitted signal. This information can be used to recover the transmitted symbol.

In an example of a homodyne receiver configuration, the current at the outputs of the balanced photodetectors can be represented by, $$I_{hom,I,l} = R\sqrt{P_{LO,l}}[\sqrt{P_s}y_{I,l}(t) + \tilde{E}_{sp,I,l}(t)] + I_{sh,I,l}(t), \quad \text{EQN. 23}$$

$$I_{hom,Q,l} = R\sqrt{P_{LO,l}}[\sqrt{P_s}y_{Q,l}(t) + \tilde{E}_{sp,Q,l}(t)] + I_{sh,Q,l}(t), \quad \text{EQN. 24}$$

where $$\tilde{E}_{sp,I,1}(t) = \text{Re}\{E_{sp,1}(t)e^{j[\omega_{LO}t + \phi_{LO}(t)]}\} \quad \text{EQN. 25}$$

$$\tilde{E}_{sp,Q,1}(t) = \text{Im}\{E_{sp,1}(t)e^{j[\omega_{LO}t + \phi_{LO}(t)]}\}, \quad \text{EQN. 26}$$

which can be used in the receiver-side symbol decision process. In an example, Bayesian estimation or one or more other estimation or decision techniques can be used for resolving symbol levels.

In an example, a transceiver can include both a coherent optical mixer, such as one or more of the heterodyne or homodyne configurations discussed above, and an optical transmitter including an optical carrier generator (e.g., an optical frequency comb generator). Individual optical carriers from the optical frequency comb generator can be coupled to the coherent optical mixer such as to provide a synchronized and stable local oscillator for downconversion.

Optical Discrete Fourier Transform

Data modulation can lead to spectral overlap between OFDM subcarriers (as shown in FIG. 1), such as precluding the use of optical narrowband filtering for individual subcarrier extraction, as is done in DWDM. Instead, a discrete Fourier transform (DFT) performed on the OFDM optical information signal can be used to demultiplex an individual subcarrier included in the OFDM optical information signal. In one approach, such a Fourier transform can be accomplished via processing the OFDM signal electronically. Such an electronic bottleneck effectively limits communication to Gigabit per second (Gb/s) data communication rates using generally-available electronic techniques.

The present inventors have recognized, among other things, that such an electronic bottleneck can be circumvented such as performing DFT in the optical domain (e.g., using an optical Fourier transform module 320 such as shown in the example of FIG. 3), demultiplexing individual subcarriers for subsequent parallel electronic processing at a lower single-carrier symbol rate. All-optical discrete Fourier transforms (ODFT), not to be confused with continuous Fourier transforms performed by lenses or free space propagation, can be performed with suitable single-mode star networks or using one or more other techniques or apparatus.

Optical discrete Fourier transforms operate continuously, as opposed to those implemented electronically. Therefore, to obtain the spectral components of a time series (e.g., the demultiplexed sub-carries of an OFDM signal), N time samples of the signal during a symbol period T can be input in parallel into the optical DFT circuit. This can be achieved such as using optical serial-to-parallel conversion using amplitude splitters, delay lines, and fast optical gating.

Local Optical Oscillator

FIG. 5 illustrates generally an example of at least a portion of an optical oscillator that can be referenced to an atomic energy level transition or a molecular energy level transition and FIG. 6 illustrates generally an example of at least a portion of a frequency comb generator, such as referenced to a signal provided by the apparatus of the example of FIG. 5. In an example, a local optical oscillator such as including the apparatus of FIGS. 5 and 6 can be used to provide a reference frequency (e.g., 10 MHz, or one or more other frequencies) such as having a specified phase noise and stability.

One or more local optical oscillators can be integrated into a common hardware platform with either (or both) an optical transmitter or receiver, such as discussed in the examples above (e.g., one or more portions of the examples of FIGS. 5 through 6 can be used as a first local optical oscillator 102A as a portion of transmitter, a second local optical oscillator 102B as a portion of a receiver, or in a transceiver as a local optical oscillator 302). Such local optical oscillators can be configured to provide a reference frequency having specified phase noise, short-term, and long-term stability, such as reducing a frequency offset between a transmitter and a receiver, or reducing a need to correct for such offsets electronically. For example, one or more of an optical carrier generator 314 (e.g., an optical frequency comb generator), a complex modulator driver, an optical mixer 310, an optical Fourier transform module 320, an electronic mixer, an analog-to-digital converter, or one or more other portions of a communication system can be referenced (e.g., "locked") to a reference frequency coupled electrically or optically from the local optical oscillator.

In an example, the one or more local optical oscillators can provide the reference frequency using one or more of an atomic energy level transition or a molecular energy level transition. Such atomic or molecular transitions can include using one or more species such as hydrogen, magnesium, ytterbium, mercury, silver, indium, aluminum, calcium, strontium, rubidium, iodine ($I_2$), acetylene ($C_2H_2$), carbon dioxide ($CO_2$), or one or more other materials.

For example, $I_2$, $C_2H_2$, or $CO_2$ can be used in molecular form, atomic species such as Hg+, Yb+, Sr+, Ca+, In+, and Al+ can be used in an ionic form, and hydrogen, magnesium, ytterbium, mercury, calcium, rubidium or silver can be used in a neutral atomic form. In an example, the one or more local optical oscillators can be configured to generate a 10 MHz reference frequency signal output for respective portions of the communication system, or including one or more other reference frequencies.

The frequency of transition of energy states of atomic or molecular material in the local optical oscillator can be used for long term stabilization. For example, the following transition can be used, $$^{87}Rb5S_{1/2}(F=2) \rightarrow 5D_{5/2}(F=4) \quad \text{EQN. 27}$$

which can represent a two-photon transition frequency. An error signal suitable for top-of-fringe locking can be derived from the transition profile. For example, such as shown in FIG. 5, a fiber coupled acousto-optic (AO) modulator can be coupled to an input of an Erbium-doped Fiber Amplifier (EDFA), such as driven with a frequency modulated (FM) signal from an FM source to impart a frequency dither on a spectroscopic probe beam. An output of EDFA can be provided to a fiber doubler that can be coupled to a Rubidium cell (or a cell including one or more other species from which an energy level transition will be probed). In an illustrative example, such an AO modulator can include an AMF-55-1550-2FP+ such as available from Brimrose Corporation of America (Sparks, Md., USA).

In an illustrative example, a driving signal can be centered at about 55 MHz, with modulation frequency and depth of 5 kHz and 150 kHz, respectively. A voltage output of Photomultiplier Tube (PMT) can be used to detect a fluorescence at a first wavelength (e.g., about 420.3 nm). Such a detected signal indicative of fluorescence can be demodulated such as using a lock-in amplifier (e.g., an SR510®) provided by Stanford Research Systems, Inc. of Sunnyvale, Calif., USA, or using one or more other apparatus or techniques). The lock-in amplifier can be referenced to a modulation frequency of AO modulator, such as to provide an error signal used to lock the frequency of a fiber laser. Such a technique can improve a long-term frequency stability of the local optical oscillator.

In addition (or instead), the local optical oscillator can also be stabilized using a dimensionally-stable high finesse optical cavity to measure its frequency fluctuations which can then be removed via a high speed feedback loop, such as shown in the lower portion of FIG. 5. Such cavity-based stabilization can be used to provide short-term stability, complementing the atomic or molecular stabilization techniques discussed above.

A laser's output can be routed to an AO modulator, such as driven by a voltage-controlled oscillator (VCO) and RF amplifier electronics, such as to correct for frequency fluctuations measured by the ultra-low expansion (ULE) cavity. In an example, a portion of the AO modulator output can be provided to a phase modulator (e.g., a fiber optic Lithium Niobate phase modulator), such as to place sidebands of the output of laser at a desired offset (e.g., in an illustrative example, at about 8.3 MHz). The phase-modulated optical energy can be coupled into a ULE glass Fabry Perot cavity of length about 7.75 centimeters (cm) and Finesse of about 150,000 (or more), although other types of cavities with different lengths and finesse values can be used. The transmission through cavity can be monitored, such as using a low speed monitor photodiode for diagnostic purposes. The reflected light from the ULE cavity can be coupled to high speed photodiode (e.g., in an illustrative example, a New Focus 1811® photodiode provided by Newport Corporation of Irvine, Calif., USA), such as using a fiber optic circulator.

An error signal can be derived, such as by mixing an output of fiber optic circulator with the drive signal of the phase modulator, such as to produce a dispersion shape signal. The dispersion shape signal can be fed back to the laser, such as with a bandwidth up to or beyond about 10 kHz, such as after filtering (e.g., using a low pass filter). In an example, a portion of the error signal can be provided to the AOM drive electronics such as for fast frequency correction with a bandwidth up into the MHz range or beyond.

In the illustrative example of FIG. 6, an output of an optical frequency comb (e.g., a fiber comb) can be used to provide a supercontinuum of optical energy peaks. In FIG. 6, connections that can be electrical are shown as broken lines, and connections that can be optical are shown with solid lines. The output of the optical frequency comb can be stabilized, such as by locking to the optical output provided from the apparatus of FIG. 5 ("to Comb Laser"), such as to provide a highly stable, low-jitter reference frequency for use in the communication system discussed in the examples above. The fiber comb need not be the optical frequency comb generator of the example of FIG. 3, but can instead be a portion of the "precision optical oscillator" shown in FIG. 3. The fiber comb transfers the stability of the stabilized optical oscillator from the optical frequency regime into the RF frequency regime.

Stabilization can be performed, for example, such as using a carrier envelope offset (CEO) stabilization loop. The CEO can be used to stabilize the comb output relative to a specified frequency (e.g., zero frequency). An octave spanning supercontinuum can be generated through a nonlinear fiber. Such a supercontinuum has a characteristic that a beat tone between a fundamental portion of the spectrum and the second harmonic of the octave of the fundamental can represent an offset of the frequency comb spectral components from "zero." Such a tone output by the frequency doubling interferometer can be mixed, such as using a digital phase detector, with an RF tone generated from disciplined arbitrary waveform generator. A mixed signal output by the digital phase detector can be fed into a controller, such as a Proportional-Integral-Derivative (PID) controller. The PID controller can adjust the pump power to the mode-locked laser of optical frequency comb generator to stabilize the offset of the optical frequency comb spectral components.

A second control loop can be used to stabilize the frequency comb spacing of the optical frequency comb generator. Such stabilization can be achieved, for example, by stabilizing the cavity length of a mode-locked fiber laser of the optical frequency comb generator. The frequency comb can be coupled with a stabilized laser (e.g., the optical output provided from the apparatus of FIG. 5 ("to Comb Laser")), which can result in an RF beat tone signifying the frequency difference between the comb line and the stabilized laser. The RF beat tone can be detected, such as using an InGaAs photoreceiver. This resulting RF beat can be mixed against a second disciplined arbitrary waveform generator in a digital phase detector. The output from the digital phase detector can be routed to a second controller, such as a PID controller, which can generate an error signal for adjusting the comb spacing. The error signal can be used, such as to control a piezo-actuated mirror inside a mode-locked laser of the optical frequency comb generator. In an illustrative example, such a piezo-actuated mirror can provide approximately 10 kHz of control bandwidth.

The present inventors have also recognized, among other things, that the use of local oscillator stabilization techniques and apparatus above can improve duration of useful synchronization between an optical transmitter and optical receiver. For example, such a synchronized duration can be extended to durations as long as several seconds (or longer), such as using a combination of short-term and long-term stabilization techniques. As a result, a better utilization of transmission bandwidth over the optical channel can be possible because data communication can be interrupted less frequently by synchronization signals sent over the channel. It is believed that such stabilization enables optical information transfer at rates approaching or exceeding hundreds of terabit per second (Tb/s) rates through a single generally-available single mode optical fiber, such as when used to provide one or more reference frequencies for a coherent optical OFDM (CO-OFDM) communication system.

In an example, synchronization information can be transferred between two or more nodes in an optical communication system. For example, a communication link such a free-space or fiber optic link can be used to transfer time or other synchronization information such as using pulses or temporal markers according to a specified communication protocol. In one approach, a pulse or marker arrival time can be measured or otherwise determined, and a temporal interval (e.g., a duration) between when the information (e.g., a marker or pulse) was transmitted and when the information was received. Applications for such synchronization can include government or civilian communications, such as telecommunications. Such synchronization can be accomplished either using a free-space or fiber-optic link, or using one or more other communication media such as a wireless electromagnetic link. In an example, one or more optical carriers or channels can be used for such synchronization, such as one or more carriers or channels in a CO-OFDM communication system.

VARIOUS NOTES & EXAMPLES

The above detailed description includes references to the accompanying drawings, which form a part of the detailed description. The drawings show, by way of illustration, specific embodiments in which the invention can be practiced. These embodiments are also referred to herein as "examples." Each of the non-limiting examples included herein can stand on its own, or can be combined in any permutation or combination with any one or more of the other examples. Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A system for generating an optical information signal, comprising:
   a local optical oscillator configured to provide a reference frequency derived from an optical cavity;
   an optical carrier generator configured to generate at least two specified optical carrier signals at least in part using the reference frequency provided by the local optical oscillator;
   a complex modulator coupled to the optical carrier generator and configured to coherently modulate the at least two specified optical carrier signals using respective baseband information signals to provide at least two respective coherently-modulated optical subcarriers;
   an optical combiner coupled to the complex modulator and configured to combine the at least two respective modulated optical subcarriers to provide the optical information signal.

2. The system of claim 1,
   wherein the optical cavity has a finesse greater than or equal to 150,000; and
   wherein the local optical oscillator is stabilised using a cavity mode supported by the optical cavity.

3. The system of claim 2, further comprising a feedback loop configured to measure and remove frequency fluctuations of the cavity mode.

4. The system of claim 3, wherein the feedback loop comprises:
   a laser configured to produce a laser output;
   an acousto-optic modulator configured to receive the laser output and produce an AO modulator output;
   a voltage-controlled oscillator and RF amplifier electronics configured to drive the acousto-optic modulator;
   a phase modulator configured to receive a portion of the AO modulator output, produce phase-modulated optical energy, and direct the phase-modulated optical energy into the optical cavity; and
   a high speed photodiode configured to receive phase-modulated optical energy reflected from the optical cavity.

5. The system of claim 4,
   wherein a portion of the phase-modulated optical energy reflected from the optical cavity is mixed with a drive signal of the phase modulator to produce a dispersion shape signal; and
   wherein the dispersion shape signal is fed back to the laser.

6. The system of claim 1,
wherein the respective baseband signals are specified to provide orthogonality between the respective coherently-modulated optical subcarriers;
wherein respective spectra of adjacent coherently-modulated optical subcarriers overlap; and
wherein the optical carrier generator comprises an optical frequency comb generator configured to provide an optical frequency comb comprising at least two specified frequency peaks, the at least two specified frequency peaks are separated by a specified frequency offset.

7. A method for generating an optical information signal, comprising:
providing a reference frequency derived from an optical cavity;
generating at least two specified optical carrier signals at least in part using the reference frequency;
coherently modulating the at least two specified optical carrier signals using respective baseband information signals to provide at least two respective coherently-modulated optical subcarriers; and
combining the at least two respective modulated optical subcarriers to generate the optical information signal.

8. The method of claim 7,
wherein providing the reference frequency includes stabilizing a local optical oscillator using a cavity mode supported by the optical cavity;
wherein the respective baseband signals are specified to provide orthogonality between the respective coherently-modulated optical subcarriers;
wherein respective spectra of adjacent coherently-modulated optical subcarriers overlap; and
wherein generating at least two specified optical carrier signals includes generating an optical frequency comb comprising at least two specified frequency peaks, the at least two frequency peaks separated by a specified frequency offset.

9. A system for receiving an optical information signal, comprising:
a local optical oscillator configured to provide a reference frequency derived from an optical cavity;
an optical Fourier transform module configured to receive an optical information signal comprising at least two coherently-modulated optical subcarriers and configured to provide at least two coherent outputs respectively corresponding to the at least two coherently-modulated optical subcarriers, at least in part using the reference frequency; and
an optical mixer coupled to the optical Fourier transform module and configured to coherently downconvert the at least two coherent outputs corresponding to the at least two coherently-modulated optical subcarriers to provide at least two respective coherently-downconverted signals, at least in part using the reference frequency.

10. The system of claim 9,
wherein the optical cavity has a finesse greater than or equal to 150,000; and
wherein the local optical oscillator is stabilized using a cavity mode supported by the optical cavity;
wherein respective spectra of adjacent coherently-modulated optical subcarriers overlap; and
wherein the optical Fourier transform module comprises an optical discrete Fourier transform module.

11. The system of claim 9, further comprising:
a balanced detector coupled to the optical mixer and configured to provide at least two respective electrical signals corresponding to at least two coherently-downconverted signals;
wherein the optical mixer and the balanced detector comprise a direct-conversion receiver configured to provide a respective in-phase electrical signal and a respective quadrature electrical signal for each of the at least two respective electrical signals.

12. The system of claim 11, further comprising:
an electrical mixer coupled to the balanced detector and configured to provide a respective in-phase electrical signal and a respective quadrature electrical signal for each of the at least two respective electrical signals.

13. The system of claim 11, further comprising:
a processor configured to receive information indicative of the at least two respective electrical signals and configured to reconstruct respective baseband information signals;
wherein the respective baseband signals are specified to provide orthogonality between the respective coherently-modulated optical subcarriers comprising the optical signal received by the optical Fourier transform module.

14. A method for receiving an optical signal, comprising:
providing a reference frequency derived from an optical cavity;
optically Fourier transforming a received optical signal comprising at least two coherently-modulated optical subcarriers to provide at least two coherent outputs respectively corresponding to the at least two coherently-modulated optical subcarriers, at least in part using the reference frequency; and
coherently downconverting the at least two coherent outputs corresponding to the at least two coherently-modulated optical subcarriers to provide at least two respective coherently-downconverted signals, at least in part using the reference frequency.

15. The method of claim 14,
wherein providing the reference frequency includes stabilizing a local optical oscillator using a cavity mode supported by the optical cavity;
wherein respective spectra of adjacent coherently-modulated optical subcarriers overlap;
wherein the optically Fourier transforming the received optical signal includes using a discrete optical Fourier transform; and further comprising:
providing at least two respective electrical signals corresponding to at least two coherently-downconverted signals using a balanced detector;
receiving information indicative of the at least two respective electrical signals; and
reconstructing respective baseband information signals, the respective baseband signals being specified to provide orthogonality between the respective coherently-modulated optical subcarriers comprising the optically-Fourier-transformed optical signal.

16. A system for generating and receiving a modulated information signal, comprising:
a transmitter configured to generate a modulated information signal synchronized to a first reference frequency provided by a first local optical oscillator; and
a receiver configured to receive the modulated information signal at least in part using a second reference frequency provided by a second local optical oscillator, the second local optical oscillator being separate from the first local optical oscillator;

wherein a frequency offset between the first reference frequency and the second reference frequency is specified to provide a symbol error rate of a received information signal below a specified threshold for a duration of at least one second of information transfer without requiring a resynchronization between the transmitter and the receiver.

17. The system of claim 16, wherein the first local optical oscillator is configured to provide the first reference frequency at least in part using an atomic energy level transition, a molecular energy level transition, or a cavity mode supported by an optical cavity.

18. The system of claim 16, wherein the second local optical oscillator is configured to provide the second reference frequency at least in part using an atomic energy level transition, a molecular energy level transition, or a cavity mode supported by an optical cavity.

19. The system of claim 16, wherein the first and second local optical oscillators provide the first and second reference frequencies at least in part using the same atomic energy level transition or the same molecular energy level transition.

20. A method for generating and receiving a modulated information signal, comprising:
    at a first location, generating a modulated information signal synchronized to a first reference frequency provided by a first local optical oscillator;
    at a second location, receiving the modulated information signal at least in part using a second reference frequency provided by a second local optical oscillator, the second local optical oscillator being separate from the first local optical oscillator; and
    wherein a frequency offset between the first reference frequency and the second reference frequency is specified to provide a symbol error rate of a received information signal below a specified threshold for a duration of at least one second of information transfer without requiring a frequency offset estimation between the first reference frequency and the second reference frequency.

21. The method of claim 20, wherein the first local optical oscillator is configured to provide the first reference frequency at least in part using an atomic energy level transition or a molecular energy level transition or an optical cavity.

22. The method of claim 20, wherein the second local optical oscillator is configured to provide the second reference frequency at least in part using an atomic energy level transition or a molecular energy level transition or an optical cavity.

23. The method of claim 20, wherein the first and second local optical oscillators provide the first and second reference frequencies at least in part using the same atomic energy level transition or the same molecular energy level transition.

\* \* \* \* \*